United States Patent
Dyer et al.

[11] Patent Number: 5,935,424
[45] Date of Patent: Aug. 10, 1999

[54] CLOSE TOLERANCE, LOW FLOW, FLOW CONTROL DEVICE USING ETCHED DISCS

[75] Inventors: Keith D. Dyer, Fountain Valley; George R. Hoppe, Covina, both of Calif.

[73] Assignee: Vacco Industries, South El Monte, Calif.

[21] Appl. No.: 08/917,598

[22] Filed: Aug. 26, 1997

[51] Int. Cl.[6] ............................ B01D 17/12; B01D 29/46
[52] U.S. Cl. ........................... 210/85; 137/808; 137/833; 210/486; 210/488; 96/393; 96/417
[58] Field of Search .................................... 137/551, 808, 137/809, 833, 810, 814, 815; 96/392, 393, 394; 210/91, 137, 346, 486, 488, 489, 490, 498, 85, 94; 216/2, 56

[56] References Cited

U.S. PATENT DOCUMENTS

| | | | |
|---|---|---|---|
| 3,111,963 | 11/1963 | Brockwell | 138/39 |
| 3,494,372 | 2/1970 | Kiwak | 137/833 |
| 3,496,961 | 2/1970 | Erwin | 137/833 |
| 3,528,445 | 9/1970 | Shinn et al. | 137/833 |
| 3,680,576 | 8/1972 | Kiwak | 137/833 |
| 3,700,111 | 10/1972 | Bode | 210/488 |
| 4,267,045 | 5/1981 | Hoof | 210/488 |
| 4,410,430 | 10/1983 | Hagler | 210/488 |
| 4,681,681 | 7/1987 | Drori | 210/488 |
| 4,726,900 | 2/1988 | Keskinen | 210/488 |
| 4,774,000 | 9/1988 | Kawai | 210/486 |
| 5,015,381 | 5/1991 | Ellion | 210/490 |
| 5,192,424 | 3/1993 | Beyne et al. | 210/91 |
| 5,296,134 | 3/1994 | Zaiter | 210/108 |
| 5,460,251 | 10/1995 | Jeffries | 188/282 |
| 5,580,454 | 12/1996 | Zaiter | 210/487 |
| 5,674,381 | 10/1997 | Decker | 210/85 |
| 5,711,877 | 1/1998 | Gonzalez | 210/488 |
| 5,798,037 | 8/1998 | Peacock | 210/85 |

*Primary Examiner*—Joseph W. Drodge
*Attorney, Agent, or Firm*—Pillsbury Madison & Sutro LLP

[57] ABSTRACT

A flow control device (FCD) controls low flow rate fluid flow to within closely tolerated and consistently maintained limits by way of improved stacked disc technology. Stacking face to face of similar disc configurations generates novel enhanced etched disc stacks allowing course and fine flow adjustments, maintenance of cleanliness, resistance to flow degradation, improved structural strength and the ability to make real time flow adjustments during mission life. A stainless/copper sandwiched embodiment seals face to face leakage faster than known means for controlling etched disc face to face seal designs.

5 Claims, 6 Drawing Sheets

CLOSE TOLERANCE, LOW FLOW, FLOW CONTROL DEVICE USING ETCHED DISCS

BACKGROUND OF THE INVENTION

1. Field of the Invention

The present invention relates to a Flow Control Device (FCD) that is unique in its ability to control low flow rate fluid flow to within very closely controlled and consistently maintained limits using etched disc technology.

2. Description of the Related Art

New aerospace systems are being designed and built to make use of ultra pure Xenon gas for propulsion and ionization control applications. These applications require very fine and consistent control of Xenon gas flow. Either too much or too little flow could cause failure to attain the mission goals. Excessive flow would also deplete the available Xenon gas supply so as to degrade the mission life.

A Flow Control Device (FCD) designed for use in this environment must satisfy a number of criteria. For example, the extreme sensitivity to contamination of high purity flow requires that the FCD be ultra clean and not generate contamination. This is to prevent the potential for contaminant particles left in the FCD during manufacturing, or generated by the FCD from entering the fluid flow. Moreover, the need for very tight flow tolerances requires that the FCD have the ability to make fine and coarse flow adjustments during manufacturing in order to economically meet the flow requirements.

The FCD must also address several potential problems. For example, the potential for degradation of flow due to contaminants upstream in the system in which the FCD is installed; the potential for damage due to over pressure, or to environmental loads such as vibration and mechanical shock which might lead to brittle material failure or other structural failure; and the limited potential for the real time fine tuning and/or course flow adjustments during applied FCD life through the control of electrical, mechanical, or other environmental inputs, must all be taken into account.

Existing flow control technologies do not sufficiently address one or more of the criteria/problems identified above. More particularly, existing, very low flow, flow controllers involve single orifice designs, designs with single or a few long tortuous paths, and sintered material plugs with multiple random tortuous paths. Each of these is lacking in some significant way.

An orifice design is difficult to control precisely, and is subject to operational degradation due to contaminants. A single, very small hole is easily plugged or restricted by a single contaminant particle. Also, very small variations in edge, surface, or size conditions will have a significant impact on actual flow.

A design based on a single (or a few) tortuous paths tends to be an improvement over a standard orifice, but still has the same control and flow degradation problems to a lesser degree. A tortuous path will also allow contaminant particles to be trapped during manufacturing. These particles are then difficult to remove in cleaning operations, but may tend to be released randomly during mission life or in a vibration environment.

A sintered plug design tends to be difficult to adjust precisely in manufacturing, and therefore requires excessive testing and sorting of product to get the desired flow adjustment. Also, the inherently non-clean manufacturing process of sintering tiny particles into a single piece makes good initial cleanliness impossible, and fine particles trapped in the sintered media may be released randomly during mission life or in a vibration environment. Fine particle system contaminant may tend to deposit on the plug surface and degrade flow over the mission life. Also, the sintered construction tends to be relatively brittle, and may lead to structural failure under mechanical loads.

Existing flow controlling etched disc designs are largely limited to flow filtration or relatively gross flow rate controlling applications. Existing etched disc flow controllers tend to benefit by reducing pressure drop across the disc. Also, in fluid filtration applications, a shorter path length is preferable for increasing flow capability through the disc path. However, excessively high flow through a given flow path of a standard configuration disc makes it impossible to attain sufficiently low and well controlled flows.

Thus, standard existing disc designs tend to try to maximizing flow and minimizing pressure drop. This and other design goals in existing disc design work against the ability to provide very low flow rate control. Accordingly, existing etched disc designs do not allow for sufficiently high and well controlled pressure drop of fluid passing from the outside to the inside perimeter of a disc when stacked face to face and compressed.

Moreover, existing disc material combination designs do not allow for sufficiently low leakage across the non-etched disc surfaces between mating discs. Excessive leakage across the non-etched disc surfaces between mating discs make it impossible to attain sufficiently low and well controlled flows. In that regard, standard existing disc designs typically make use of stainless steel or titanium materials. These do not have the necessary compliance and available surface finish to create an efficient face to face seal under appropriate compression loading.

SUMMARY OF THE INVENTION

We have developed a Flow Control Device (FCD) that is unique in its ability to control low flow rate fluid flow to within very closely controlled and consistently maintained limits using etched disc technology. More particularly, we have developed an etched flow control disc that is unique in its ability to control low flow rate fluid flow to within very closely controlled and consistently maintained limits when stacked face to face with similar disc configurations. This technology is unique and superior to other flow controlling etched disc designs. Using the etched flow control discs, we have developed a high performance, low flow, etched disc stack configuration of a flow control device (FCD) that offers significant advantages over existing designs. This new FCD solves many of the potential problems associated with existing flow controllers and orifice designs. Indeed, this FCD provides substantial improvements over existing designs to maintain cleanliness, allow course and fine flow adjustments, resist flow degradation in use, provide excellent structural strength, and provide for opportunity to allow real time flow adjustments during a mission life. Additionally, we have developed a stainless/copper sandwich approach that is unique in its ability to seal face to face leakage between discs to within very insignificant limits. This approach is unique and superior to other flow controlling etched disc face to face seal designs.

Other objects, features, and characteristics of the present invention will become apparent upon consideration of the following description and the appended claims with reference to the accompanying drawings, all of which form a part of the specification, and wherein like reference numerals designate corresponding parts in the various figures.

DETAILED DESCRIPTION OF THE PRESENTLY PREFERRED EXEMPLARY EMBODIMENTS

We have developed a high performance, low flow, etched disc (LFED) configuration for flow control applications that offers significant advantages over existing disc designs. This new LFED design solves the problems associated with existing flow control disc designs and allows course and fine flow control when stacked face to face.

The new disc design advantageously makes use of unique materials to allow efficient face to face sealing when compressed. A material with better compliance and available surface finish than standard etched flow control discs is thus preferably used for the etched disc or incorporated as a part of the disc stack. Appropriate materials will commonly be metallic for fluid compatability purposes, but a variety of other such materials could be applied.

The new disc design also makes use of a relatively very long etched path configuration to increase pressure drop along the disc path through laminar flow frictional losses. Such a design provides for the ability to finely control flow through an etched path with given depth and width characteristics by varying its length.

The FCD, utilizing our unique LFED, solves a number of potential problems which other existing flow technologies fail to solve in one or more ways. Other aerospace and industrial flow control applications (such as in the electronic IC manufacturing industry) may also benefit by our solution to these problems.

More particularly, the FCD design provides for the ability to maintain superior cleanliness of product for high purity flow control applications. During assembly, each individual detail component is cleaned. This includes each disc, and so each individual flow path. No welding or brazing processes are used on the disc stack itself. The ability to provide this initial cleanliness, along with a controlled assembly environment assures that no particles will be introduced into the FCD that may contaminate the working fluid during operation. The compressed disc stack configuration allows no relative motion between assembled components, and therefore no opportunity for particle generation.

The FCD design provides the ability to make course and fine flow adjustments during manufacturing through the control of several manufacturing processes primarily including disc etched flow path geometry, disc quantity used, and level of compression of disc stack.

The FCD design provides good resistance to flow degradation due to upstream contaminants. Multiple flow paths, and inlet filtration of each flow path are provided. This minimizes the potential for significant restricting of flow paths due to contaminants in the system in which the FCD is installed.

The FCD design provides good structural strength to minimize the potential for damage due to over pressure, or other environmental loads. The all metallic compressed stack provides a monolithic structure for excellent structural strength. Brittle materials, such as ceramic, that may fail in vibration or mechanical shock are preferably not used.

The FCD design provides potential for design enhancement including the application of new etched disc materials to allow for the real time fine tuning and/or coarse flow adjustments during mission life through the control of electrical, mechanical, or other environmental inputs.

The FCD design consists of numerous metallic discs stacked face to face to form a multiple-disc stack. Some or all of the discs in the stack have one or a few flow paths etched from the outer perimeter to the inner perimeter of the disc along one face. The etched path depth is well less than the disc material thickness, and is closely controlled to provide known flow characteristics for each disc. The disc stack is then mechanically compressed so as to provide surface to surface sealing everywhere except at the etched path. The open face of each etched path is therefore closed against the non-etched face of the next disc in the stack. This configuration creates a series of channels from the outer to the inner surface of the disc stack. Each end of the disc stack is sealed against an inlet and outlet tube piece respectively, and the stack is enclosed in a pressure boundary housing. Flow through the FCD enters through the inlet tube, passes through the multiple controlled passages in the disc stack, and exits through the outlet tube. For given test conditions, the flow through the FCD is limited by the flow pressure drop characteristics of each path, and the number of etched paths in the disc stack. The flow characteristics of each path geometry can be estimated by analysis, and more precisely determined by test. Typically, the etched path geometry would be such that flow through the path is laminar flow.

Figure 1:
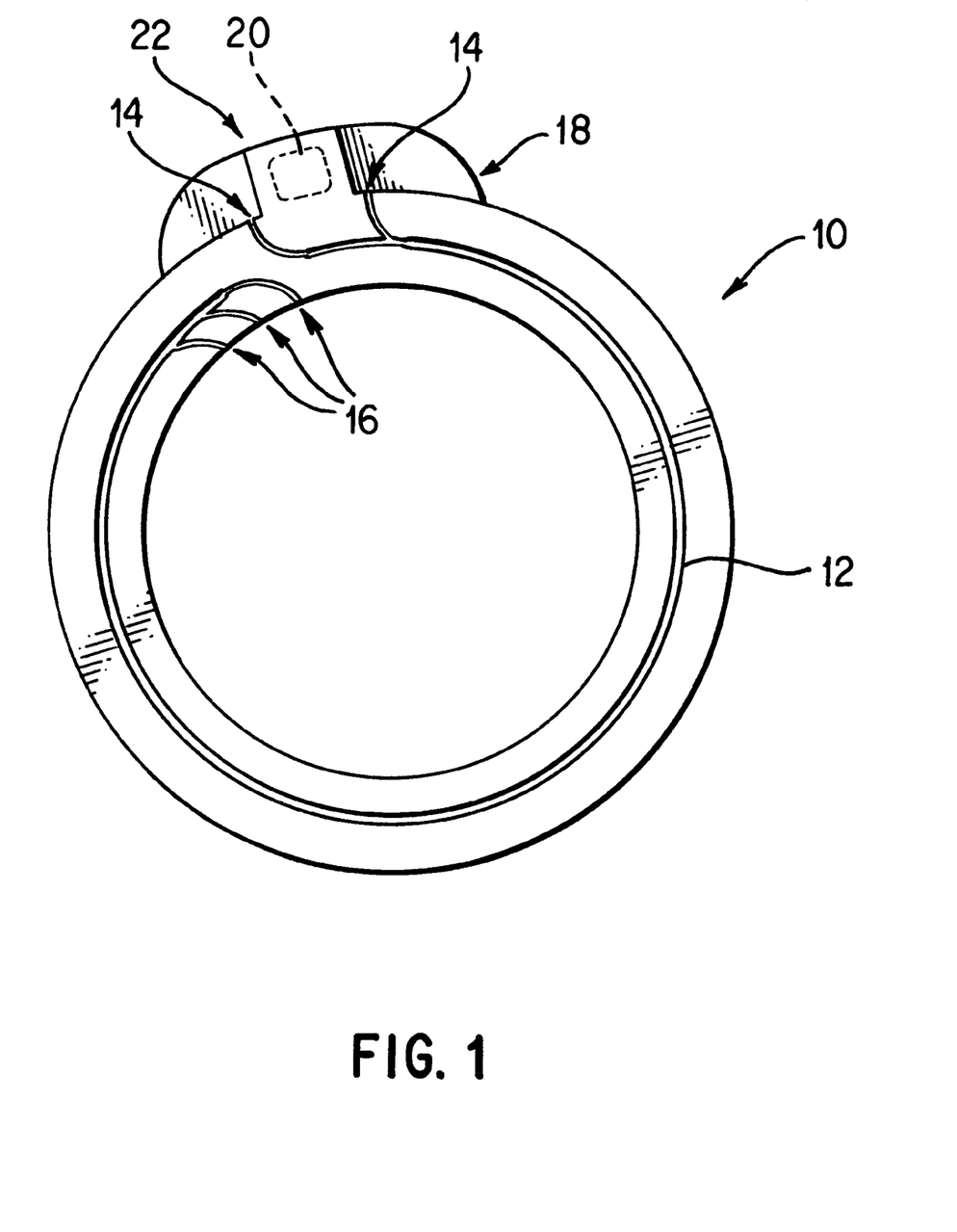
FIG. 1 is a plan view of an etched disc provided in accordance with the present invention.

A typical FCD etched disc 10, provided in accordance with the invention, is shown in FIG. 1.

The single most critical geometric feature of the disc 10 is the presence of a well controlled etched path 12 from the outer to the inner perimeter. The actual etched path length is increased relative to conventional etched discs, with an appropriate path design to provide for increased frictional pressure drop. Several other features provide significant enhancements to the FCD function. Multiple inlets 14 and outlets 16 from each etched path 12 provide greater resistance to flow degradation from contaminants, and minimize any tendency to reduce the inlet or outlet during disc stack compression.

Figure 1A:
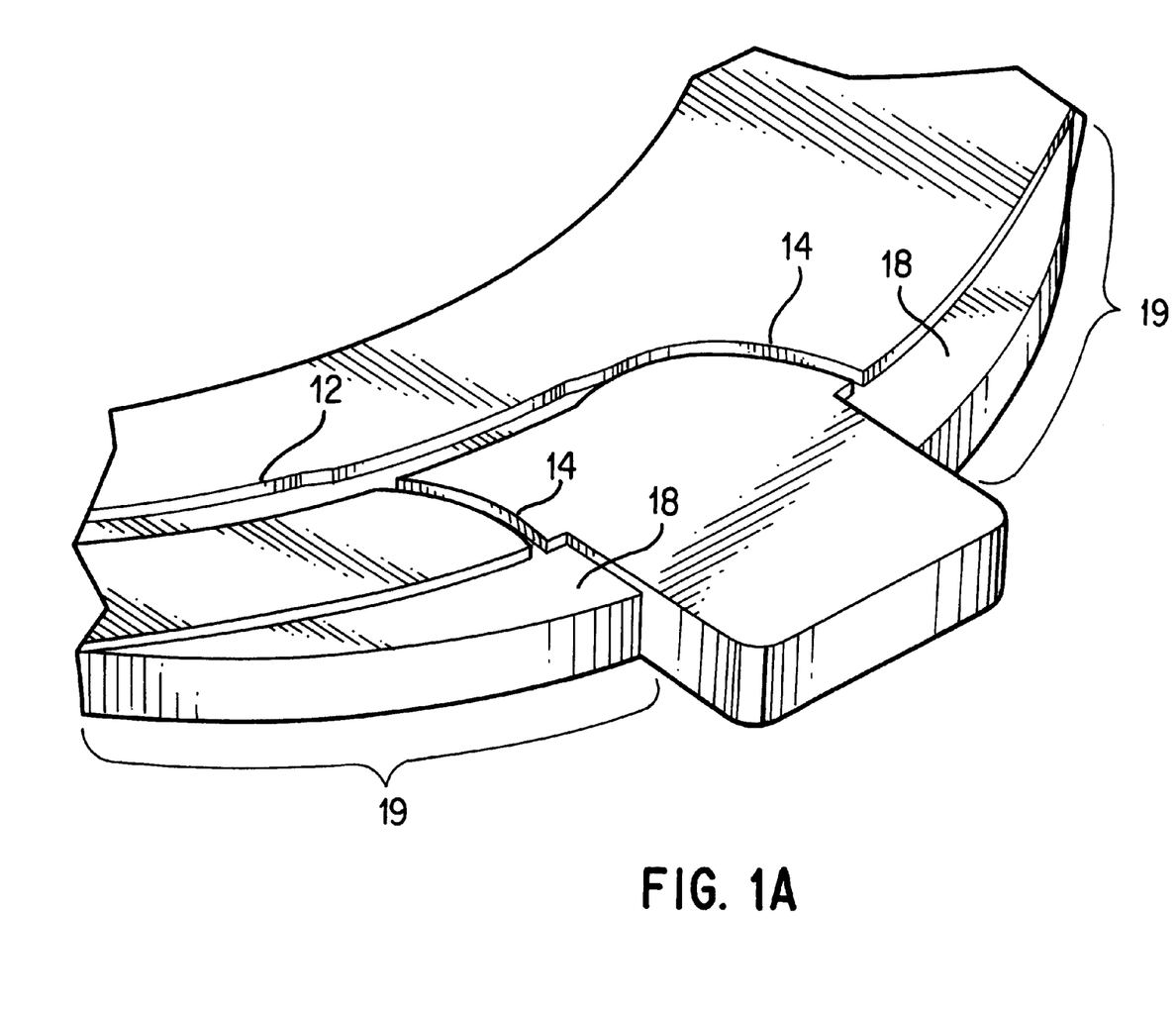
FIG. 1A is an enlarged, schematic perspective view of an inlet filter area in accordance with the invention.

Furthermore, inlet filter areas 18 provide for pre-filtering of the fluid to help prevent degradation of flow due to contaminants. More particularly, with reference to FIG. 1A, each inlet filter area 18 is a relatively large etched area of the disc 10 from which the relatively narrow etched path inlet 14 initiates. When compressed against an non-etched disc surface, this area 18 forms a large opening 19 which will tend to filter out particles larger than the path depth without significantly blocking the flow through the critical path.

An etched identification number and/or other indicia 20 can advantageously be provided on a tab area 22 to differentiate between similar configurations of FCD disc.

The disc flow characteristic can be controlled through careful control of the path depth, width, and length. An example of flow path geometry and resulting flow characteristics is as follows (Test data nominalized to a single disc flow value; noted dimensions are approximate): for a path depth of about 15 microns, a path width of about 0.015 inches, and a path length of about 2 inches, the nominalized flow per disc is about 0.7 sccm Xenon with an inlet pressure of about 35.3 psig, and flowing to sea level ambient downstream pressure.

For shorter paths, it is possible to incorporate more than one path per disc, if desired. Alternate path designs may also be used to adjust the flow to meet a wide variety of flow requirements. These alternate designs may take advantage of such flow phenomenon such as repeated expansion and contraction (FIG. 2H), or flow reversing (FIG. 2I), or Tesla diodes (flow devices in which fluid is separated from the primary flow in one flow direction, and directed back against the primary flow to increase pressure drop in that flow direction; flow in the opposite direction is not affected by this fluidic device) to provide the desired results.

Exemplary alternate flow path designs are shown in FIGS. 2A–J. By way of example, the discs 110, 210, 310, 410, 510, 710, 810, 910, and 1010 of FIGS. 2 A–E and G–J are made of 316L stainless steel and have an inner diameter of about 0.495 +/−0.002 inches, an outer diameter of about 0.688 +/−0.002 inches, a thickness of about 0.002 inches and a channel width of about 0.015 to 0.018 inches. The disc 610 of FIG. 2F may be copper, as detailed below. In that event, it has a thickness of about 0.004 inches. When such a non-etched disc 610 is formed from stainless steel, it has a thickness on the order of about 0.010 inches. It should be noted that the above recited dimensions are for the purposes of example and the invention in its broadest respect is not to be limited to the recited dimensions.

Figure 2A:
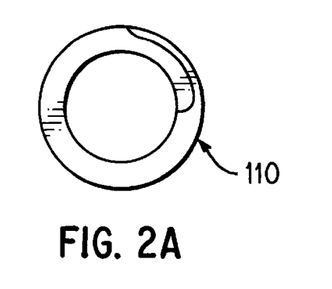
FIGS. 2A–J are plan views of alternate disc configurations provided in accordance with the present invention.
Figure 2B:
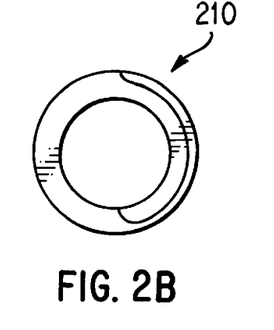
Figure 2C:
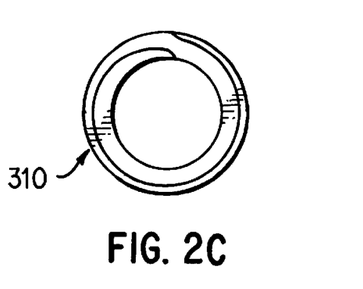
Figure 2D:
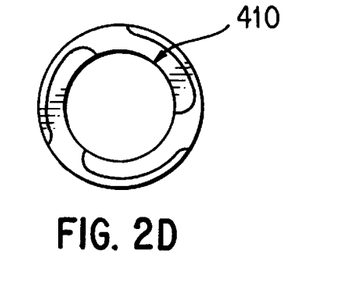

The configurations schematically depicted in FIGS. 2A–E are self-explanatory. The configuration of FIG. 2G is a particularly short path. As noted above, FIG. 2H shows a path with repeated expansion and contraction whereas FIG. 2I shows a long path with reversed flow direction. FIG. 2J shows a segment of a single long path which ports fluid from one disc to another along a path which is connected from disc to disc. The first and last disc of the disc stack (described more particularly below) or a flow path defining subsection thereof must in this embodiment be uniquely designed to provide the path inlet and outlet from the perimeters of the disc. The flow characteristics of these designs are unique and are be expected to be useful for various filtering and/or other flow control applications.

The FCD disc stack configuration 24 (FIG. 3) is made up of a plurality of discs 10, each having a configuration, e.g., similar to one or more of those shown in FIG. 1, or FIGS. 2A–J, as detailed below.

High disc stack compression loads are generally required to provide an acceptable face to face disc seal. In order to allow better repeatability and flow control through control of the path geometry, leakage between discs other than through the etched path should be minimal relative to the flow through the etched paths. Existing etched disc flow controllers are generally stainless steel or titanium, and do not provide efficient sealing between disc faces. Indeed, experience has shown that with current stacking techniques, stainless steel discs may not provide a sufficient sealing capability for the flow control discussed herein above, when stacked together with other stainless steel discs.

Thus, with current stacking techniques, undesirable leakage between mating stainless steel discs can occur. To address this problem, we have developed a high performance, low leakage, material combination to efficiently seal flow control discs when compressed face to face. Face to face sealing between discs is made possible by using disc material with improved compliance and available surface finish to allow an effective seal between itself and the face of a mating disc. Materials such as copper, HYMU 80, and HYMU 800 (nickel alloys) have been shown to be successful in maintaining such a seal against discs of similar material or stainless steel. Other soft metals such as other copper, aluminum, and nickel alloys may have similar results. Moreover, while appropriate materials will commonly be metallic for fluid compatibility purposes, a variety of other such materials could be applied. Indeed, plastic and other non-metal materials may also provide acceptable results in applications for which the respective material is compatible to the environment. The flow paths may be etched into discs of a material which will seal well against a similar disc next to it, or sealing discs without etched flow paths may be sandwiched between each disc with an etched flow path (possibly of a different material such as stainless steel) to provide for the necessary sealing capability.

Figure 2F:
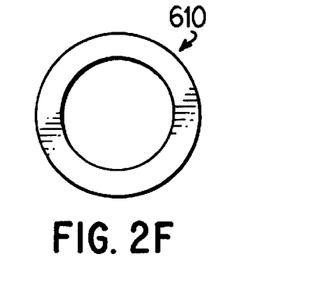
Figure 3:
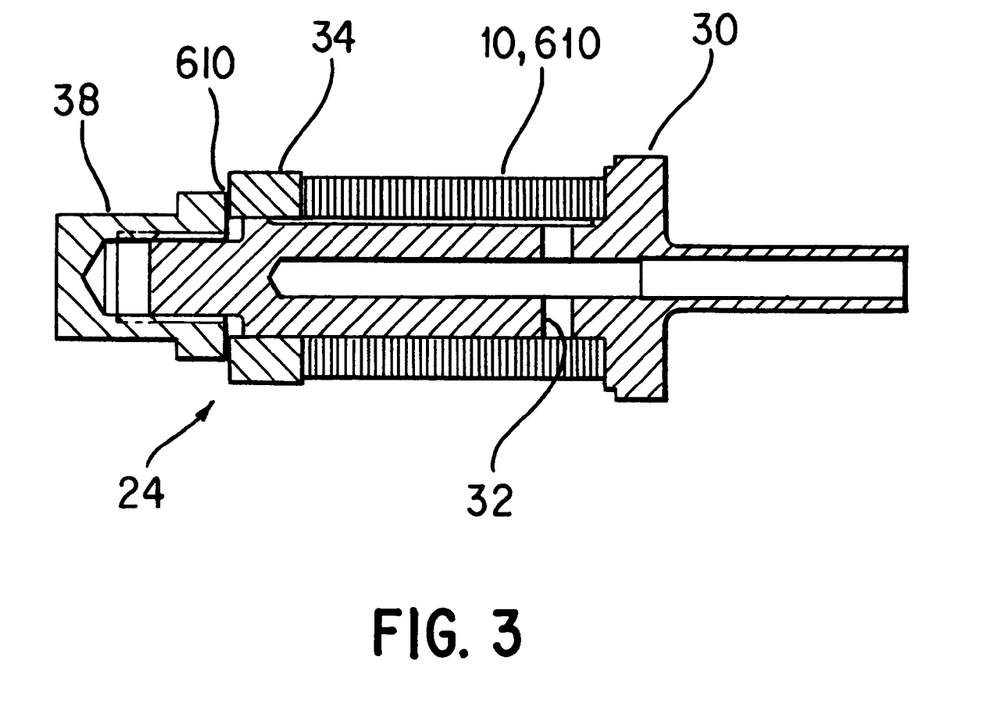
FIG. 3 is an elevational view of a disc stack provided in accordance with the present invention.

An exemplary stack configuration 24 is shown in FIG. 3. In the illustrated embodiment, e.g., 150 discs, for example having a configuration as illustrated in FIG. 1 or FIG. 2A, are assembled in an alternating manner with, e.g., 150 copper discs 610, for example having a configuration as illustrated in FIG. 2F to a central element tube 30. The central tube 30 has cross drilled holes 32 to allow flow therethrough. A compression washer 34 is applied to the end of the stacked discs. The discs 10 and compression washer 32 are adjustment features and other configurations as discussed above may be used as acceptable alternatives, as required for appropriate adjustment. The disc quantity specified may also be modified as required for adjustment.

The assembled stack has a compression load of approximately 200 PSI applied thereto, e.g., using a 5 inch ram. Once stacked and compressed, the disc stack is held in its compressed state by an appropriate means. We have used a compression nut 38 tightened onto a threaded end piece 36 of the tube 30 to maintain the stack compression. A copper disc 610 is advantageously disposed between the nut and the compression washer to ensure a good seal. At that point, the disc stack 24 may be tested for the desired flow requirements. If necessary, adjustments may be made to the actual flow by adding or removing discs to change the number or type of flow paths, or by modifying the disc stack compression load to vary the path geometry through minor physical compression of the disc material. If such sensitivity to compression load is undesirable, it can be minimized by using somewhat harder materials such as nickel alloy and stainless steel instead of softer material such as copper. As discussed above, the stacked, compressed configuration of FIG. 3 creates a series of channels from the outer to the inner surface of the disc stack. The assembled and compressed stack is enclosed in a pressure boundary housing 40.

Figure 4A:
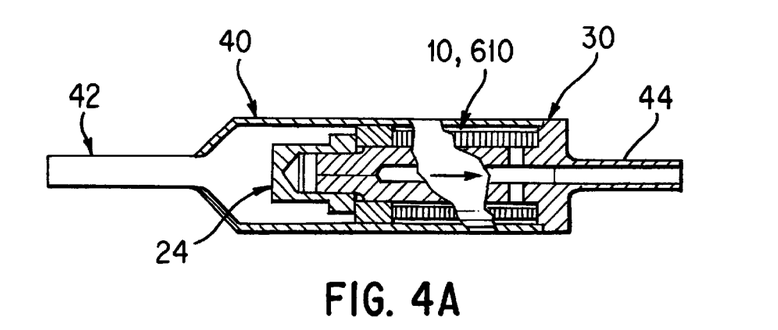
FIGS. 4A and 4B are cross-sectional views of exemplary Flow Control Devices provided in accordance with the present invention.
Figure 4B:
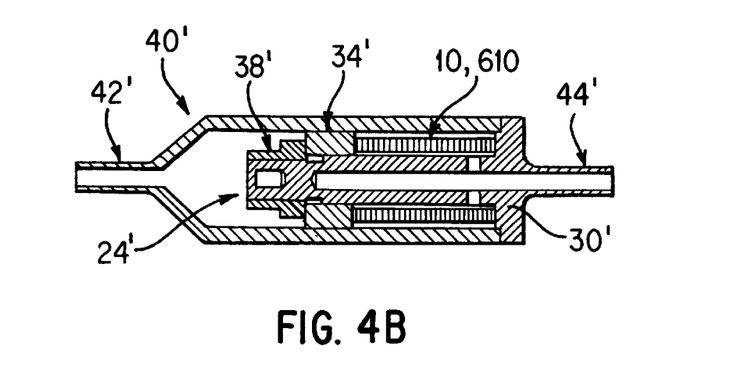
Figure 4C:
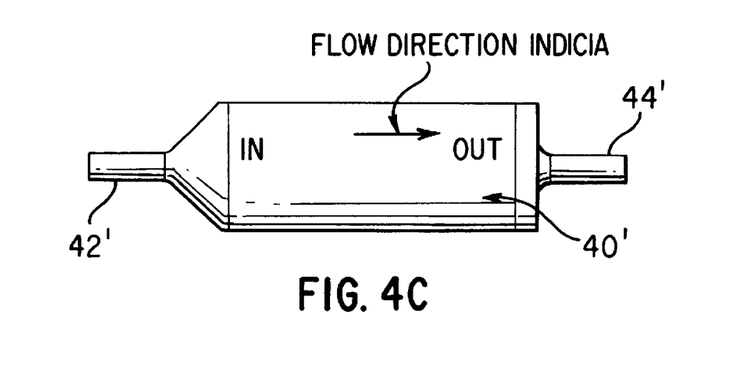
FIG. 4C is an elevational view of the Flow Control Device of FIG. 4B.

FIGS. 4A–C show exemplary fully assembled Flow Control Devices, in accordance with the invention. By way of example, the body or housing 40, 40' is electron beam welded to the tube structure 30, 30', each of which are formed from e.g. 304L stainless steel. Furthermore, identification information and/or a flow directional arrow can be electrochemically etched on the body as shown. Flow through the FCD enters through the inlet tube 42, 42', passes through the multiple controlled passages in the disc stack 24, 24', and exits through the outlet tube 44, 44'. In the embodiment of FIG. 4A, the total length of the Flow Control Device, omitting the inlet and outlet tubes, is about 3.255 +/−0.0070 inches and the width is about 1 inch. In the embodiment of FIGS. 4B and C, the total length of the Flow Control Device, omitting the inlet and outlet tubes, is about 3.25–3.45 +/−0.020 inch and the width is about 1.13 inch.

EXAMPLES

We have developed qualification test units for electric propulsion. One exemplary unit was adapted to the requirements of 3.1 sccm Argon flow at 35.3 psig inlet with sea level ambient outlet, and 70° F. Another exemplary unit was adapted to requirements of 35 scam Argon flow at 84.3 psig inlet with sea level ambient outlet, and 70° F.

Figure 5:
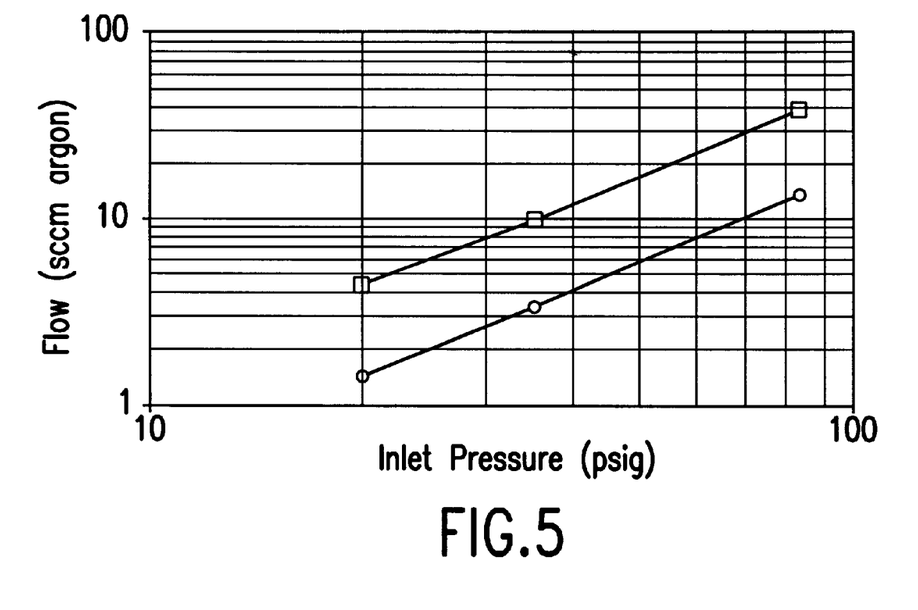
FIG. 5 is a graph of Flow vs. Inlet Pressure for two Flow Control Device configurations provided in accordance with the present invention.

The sample test data shown in FIG. 5 reflects these two different configurations of FCD. More particularly, the hardware configurations used to produce the test data noted in FIG. 5 is of the general configuration shown in FIG. 4A with alternating copper and stainless discs. Each of these two units was adjusted to specified flow parameters using a different combination of disc configurations and compression load.

Figure 2E:
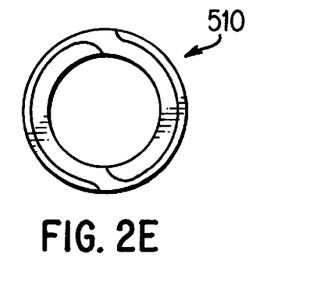
Figure 2G:
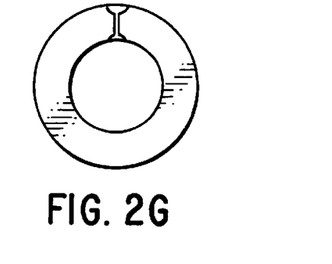
Figure 2H:
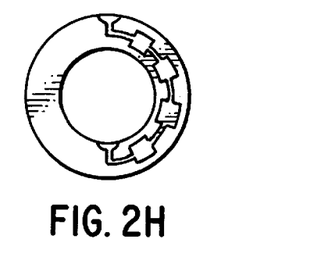
Figure 2I:
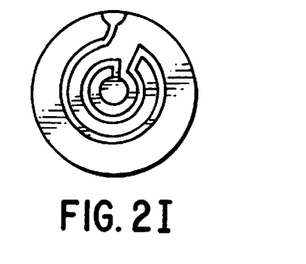
Figure 2J:
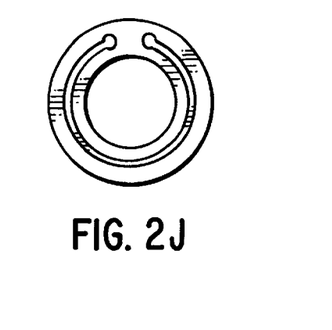

The higher flow unit (data marked with square symbols) was stacked with 65 two passage discs similar to FIG. 2E. The nominal path width and depth and length were 0.015 inches, 15 microns, and 1 inch respectively. This disc stack was compressed with about 3800 pounds. The target flow range of 33.3 scam to 35.5 scam argon at 84.3 psig inlet pressure was met with a flow rate of 35.15 scam argon at 84.3 psig inlet pressure.

The lower flow unit (data marked with circle symbols) was stacked with 140 single passage discs similar to FIG. 2A, and 60 single passage discs similar to FIG. 2C. For the 140 discs, the nominal path width and depth and length were 0.015 inches, 8 microns, and 0.5 inches respectively. This disc stack was compressed with about 3500 pounds. The target flow range of 2.9 sccm to 3.1 sccm argon at 35.3 psig inlet pressure was met with a flow rate of 3.1 sccm argon at 35.3 psig inlet pressure.

While the invention has been described in connection with what is presently considered to be the most practical and preferred embodiments, it is to be understood that the invention is not to be limited to the disclosed embodiments, but, on the contrary, it is intended to cover various modifications and equivalent arrangements included within the spirit and scope of the appended claims. Thus, it is to be understood that variations in the particular parameters used in defining the etched disc and disc stack of the present invention can be made without departing from the novel aspects of this invention as defined in the claims.

What is claimed is:

1. A flow control element having an inner peripheral edge and an outer peripheral edge and first and second parallel surfaces, one of said surfaces having at least one flow path defined thereon, said flow path having a plurality of inlet openings at said outer peripheral edge, and at least one outlet opening at said inner peripheral edge, said flow path extending on said one surface at least part circumferentially thereof so as to define a flow path length substantially greater than a linear distance between said inner and outer peripheral edges;

wherein the inner and outer peripheral edge are each generally circular;

further including an inlet filter area defined adjacent each said inlet opening;

wherein said at least one of a single said flow path, two said flow paths each having a same configuration, and three said flow paths each having a same configuration is formed by etching each said surface respectively; and further comprising at least one tab element having indicia etched thereon.

2. A structure as in claim 1, further comprising discs being formed from one of nickel and copper.

3. A structure as in claim 1, further comprising discs being formed from stainless steel.

4. A structure as in claim 1, further comprising stacked discs being alternating etched and non-etched discs.

5. A structure as defined in claim 1, further comprising non-etched discs being formed from one of nickel and copper.

* * * * *